US012155918B2

(12) United States Patent
Kanamori

(10) Patent No.: US 12,155,918 B2
(45) Date of Patent: Nov. 26, 2024

(54) VEHICLE EXTERNAL REGION IMAGING APPARATUS

(71) Applicant: SUBARU CORPORATION, Tokyo (JP)

(72) Inventor: Masato Kanamori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 18/298,046

(22) Filed: Apr. 10, 2023

(65) Prior Publication Data
US 2023/0353851 A1 Nov. 2, 2023

(30) Foreign Application Priority Data

Apr. 27, 2022 (JP) ................................. 2022-073467

(51) Int. Cl.
H04N 23/54 (2023.01)
B60S 1/02 (2006.01)

(52) U.S. Cl.
CPC ............. H04N 23/54 (2023.01); B60S 1/023 (2013.01)

(58) Field of Classification Search
CPC ................................ H04N 23/54; B60S 1/023
See application file for complete search history.

(56) References Cited

U.S. PATENT DOCUMENTS

| | | | |
|---|---|---|---|
| 11,220,223 B2 * | 1/2022 | Takagi | B60J 1/002 |
| 2021/0291739 A1 * | 9/2021 | Kasarla | G06V 20/69 |
| 2022/0239817 A1 * | 7/2022 | Kasarla | B60R 11/04 |

FOREIGN PATENT DOCUMENTS

JP 2021-37948 A 3/2021

* cited by examiner

Primary Examiner — Mishawn N. Hunter
(74) Attorney, Agent, or Firm — Rimon P.C.

(57) ABSTRACT

A vehicle external region imaging apparatus to be mounted inside a vehicle is configured to perform imaging of a region outside the vehicle through a glass of the vehicle. The vehicle external region imaging apparatus includes a light receiver and a front part. The light receiver is configured to receive light to be transmitted through the glass. The front part is provided on a light incident side of the light receiver and configured to block reflected light that is to be reflected by an inner surface of the glass and enters the light receiver, and has a blowing path provided between the front part and the inner surface of the glass and configured to allow a wind to flow therethrough. The front part has, at an inlet of the blowing path, a curved surface bulging toward the inner surface of the glass and a curved surface bulging toward the blowing path.

5 Claims, 7 Drawing Sheets

VEHICLE EXTERNAL REGION IMAGING APPARATUS

CROSS-REFERENCE TO RELATED APPLICATIONS

The present application claims priority from Japanese Patent Application No. 2022-073467 filed on Apr. 27, 2022, the entire contents of which are hereby incorporated by reference.

BACKGROUND

The disclosure relates to a vehicle external region imaging apparatus that is to be mounted inside a vehicle and performs imaging of a region outside the vehicle through a glass of the vehicle.

A vehicle external region imaging apparatus includes a device such as an in-vehicle camera and is provided on an inner side of a glass of a vehicle. The vehicle external region imaging apparatus may record an image and use the image for a drive recorder, or acquire data on a region outside the vehicle from the image and use the data for a vehicle control such as a steering wheel control, a brake control, or an accelerator control. Japanese Unexamined Patent Application Publication No. 2021-37948 discloses a technique in which a field of view regulating part is provided in a fan shape around a front region of a camera to prevent light reflected from a glass from being reflected in a lens part. In addition, the technique introduces defroster wind from a vent so as not to cause condensation or fogging on an inner surface of the glass or a lens.

SUMMARY

An aspect of the disclosure provides a vehicle external region imaging apparatus to be mounted inside a vehicle. The vehicle external region imaging apparatus is configured to perform imaging of a region outside the vehicle through a glass of the vehicle. The vehicle external region imaging apparatus includes a light receiver and a front part. The light receiver is configured to receive light to be transmitted through the glass. The front part is provided on a light incident side of the light receiver and configured to block reflected light that is to be reflected by an inner surface of the glass and enters the light receiver, and has a first blowing path provided between the front part and the inner surface of the glass and configured to allow a wind to flow therethrough. The front part has, at an inlet of the first blowing path, a curved surface bulging toward the inner surface of the glass and a curved surface bulging toward the first blowing path.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
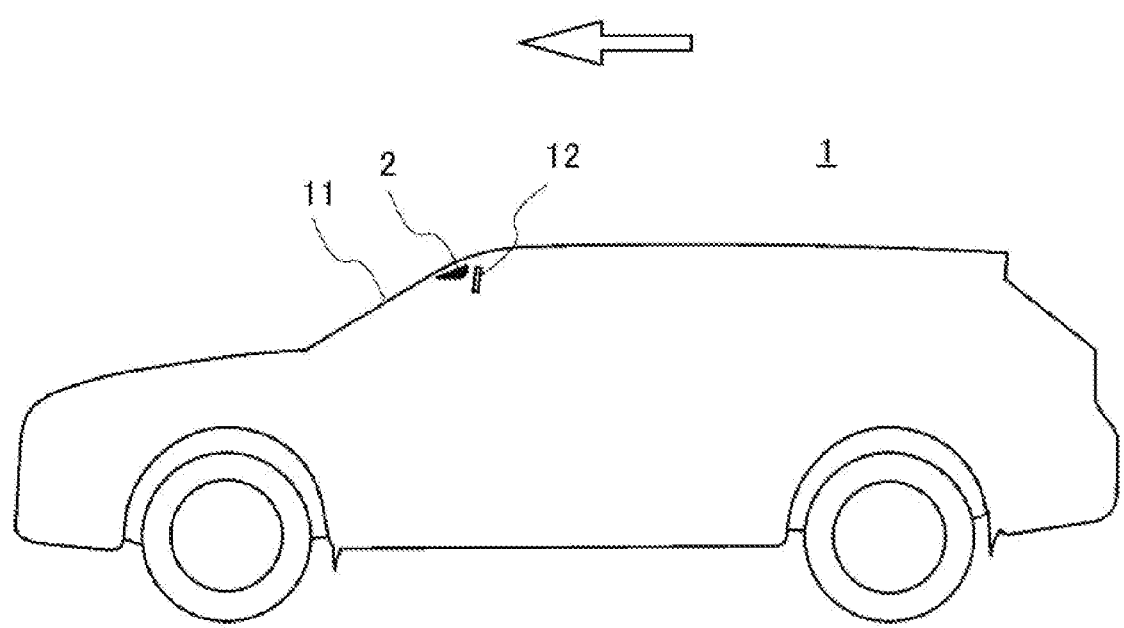
FIG. 1 is a side view of a vehicle provided with a vehicle external region imaging apparatus according to one example embodiment of the disclosure.

In order to prevent light reflected from a glass from being reflected in a lens part, it is necessary to narrow a gap of a vent. However, the narrow vent makes it difficult to sufficiently take in defroster wind, which in turn makes it difficult to effectively prevent generation of condensation and fogging or effectively remove the condensation and the fogging.

It is desirable to provide a vehicle external region imaging apparatus that makes it possible to sufficiently take in defroster wind with a gap of a vent being narrowed and to effectively prevent generation of condensation and fogging or effectively remove the generated condensation and fogging.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
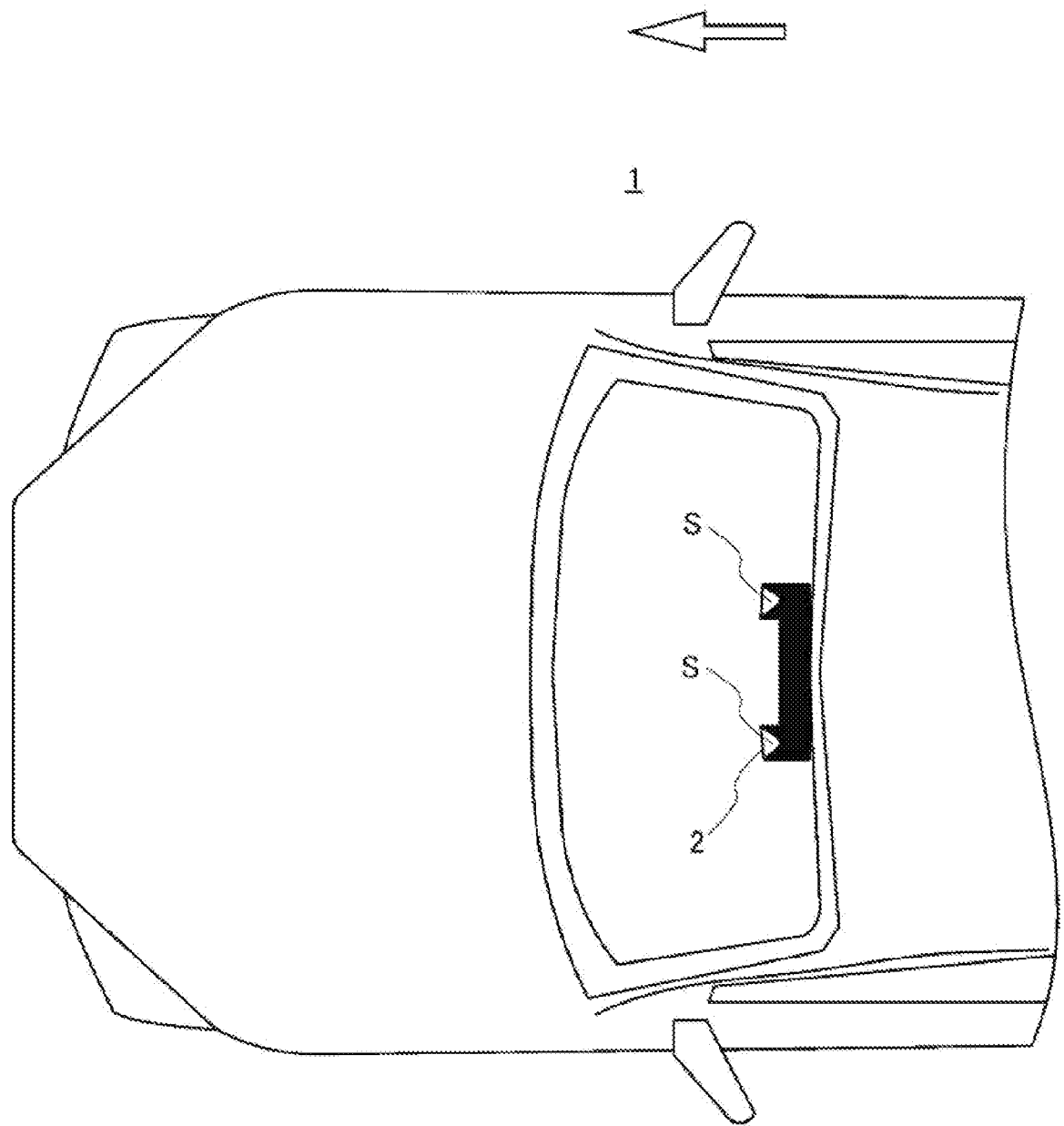
FIG. 2 is a front top view of the vehicle provided with the vehicle external region imaging apparatus.

A vehicle external region imaging apparatus according to an example embodiment will be described that is applied to a driving assist system and captures an image of a region outside a vehicle. FIG. 1 is a side view of a vehicle 1, and illustrates a mounting position of the vehicle external region imaging apparatus 2 in the vehicle 1. In FIG. 1, a white arrow indicates the front of the vehicle 1. The vehicle external region imaging apparatus 2 according to the example embodiment may be provided in front of a rearview mirror 12 on an inner side of a windshield 11. In one embodiment, the windshield 11 may serve as a "glass" of the vehicle 1. The vehicle external region imaging apparatus 2 may be positioned on a rear side of the rearview mirror 12 when viewed from a driver who drives the vehicle 1. The vehicle external region imaging apparatus 2 may be attached to the windshield 11 at the middle of an upper part of the windshield 11. FIG. 2 is a top view illustrating a front area of the vehicle 1 as viewed from above. Referring to FIG. 2, the vehicle external region imaging apparatus 2 may include cameras 21 provided at the rear of respective two camera front spaces S positioned on the right and the left sides in a traveling direction of the vehicle 1. In FIG. 2, a white arrow indicates the front of the vehicle 1. The camera 21 may be or may have a light receiver that receives light transmitted through the windshield 11. In one embodiment, the camera 21 may serve as a "light receiver". An upper surface of the vehicle external region imaging apparatus 2 may be shielded from the outside by a light-shielding part of the windshield 11, except for regions corresponding to the camera front spaces S. The camera 21 may be positioned below the light-shielding part and is not illustrated in FIG. 2.

Figure 3:
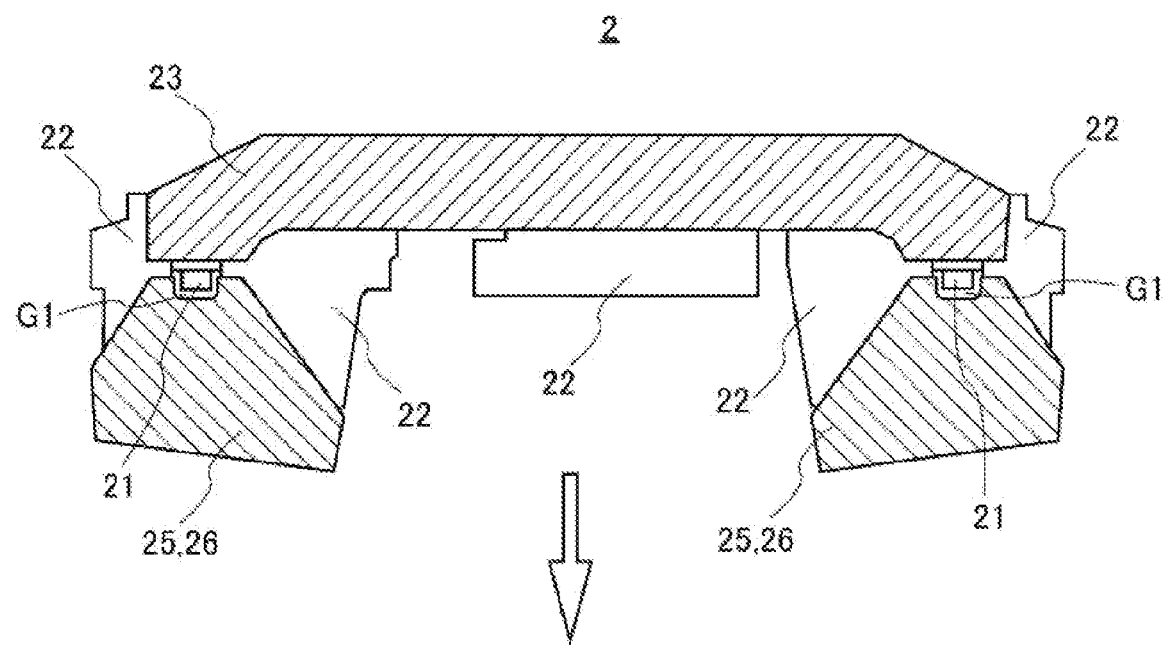
FIG. 3 is a bottom view of the vehicle external region imaging apparatus.

FIG. 3 is a view of the vehicle external region imaging apparatus 2 attached to the windshield 11 of the vehicle 1 as viewed from below, with a cover member being removed. In FIG. 3, a white arrow indicates the front of the vehicle 1. An attachment member 22 may have an upper surface that corresponds to a rear side in FIG. 3. The upper surface of the attachment member 22 may be attached to the windshield 11 by bonding. The attachment member 22 may be an iron plate. The attachment member 22 may be coupled to any member of the vehicle external region imaging apparatus 2. A circuit unit 23 may be provided with ECU such as a recognition device that recognizes a captured image. The circuit unit 23 may be covered with a circuit unit cover. The two cameras 21 may be coupled to the circuit unit 23. A light shielding member 26 may be provided in front of each camera 21. In a comparative example, a light shielding member 25 is provided in front of each camera 21. The light shielding member 25 according to the comparative example and the light shielding member 26 according to the example embodiment may be substantially similar to each other when viewed from below, and are both illustrated together in FIG. 3 accordingly. The light shielding member 25 or 26 may be provided to oppose an inner surface of the windshield 11, and may be positioned below the camera 21 to block light from an interior of the vehicle 1. The camera 21 and the light shielding member 25 or 26 may have a gap G provided therebetween, allowing an airflow to travel downward through the gap G from an upper part of the light shielding member 25 or 26. The vehicle external region imaging apparatus 2 may be mounted inside the vehicle 1, and may perform imaging of a region outside the vehicle 1 through the glass of the vehicle 1 by the cameras 21.

Figure 4:
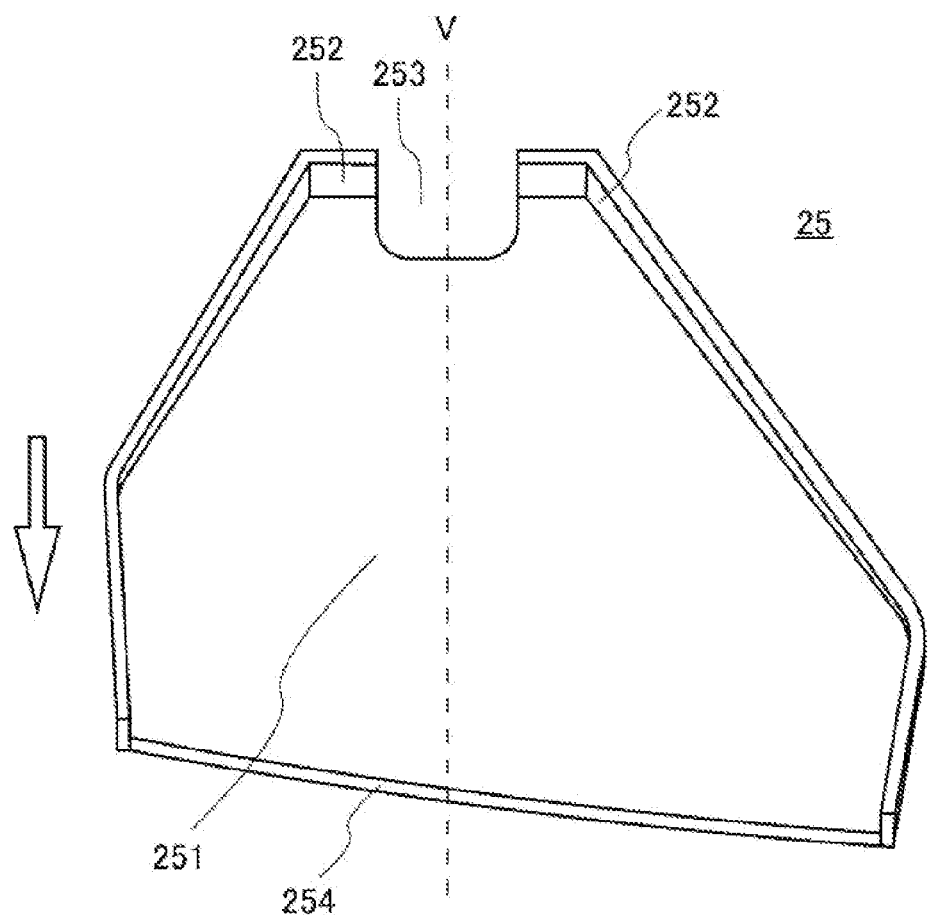
FIG. 4 is an oblique top view of a light shielding member according to a comparative example.

FIG. 4 is a view of the light shielding member 25 according to the comparative example as viewed from an obliquely upper side. In FIG. 4, a white arrow indicates the front of the vehicle 1. FIG. 4 is a diagram as viewed from the windshield 11 side, and corresponds to a front view of the light shielding member 25 in FIG. 3. The light shielding member 25 has a lateral width that is gradually narrowed in a lateral direction from the middle in a front-rear direction to the rear. A side plate 252 rises from a side of a flat bottom plate 251. The side plate 252 is provided in three directions, excluding the front of the bottom plate 251. The bottom plate 251 and the side plate 252 are cut out at a rear part of the light shielding member 25, providing a cut-out 253.

Figure 5:
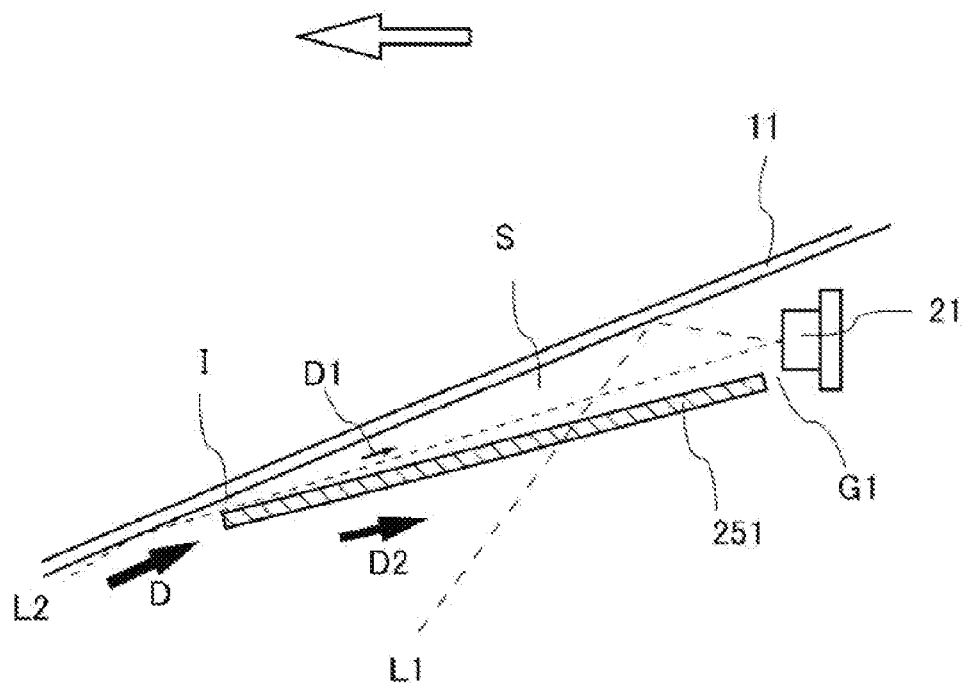
FIG. 5 is a cross-sectional view of a region in the vicinity of the light shielding member according to the comparative example.

FIG. 5 is a cross-sectional view of the light shielding member 25 according to the comparative example, vertically cut along a dotted line V in FIG. 4, and of a region in the vicinity of the light shielding member 25. The camera front space S is provided between the windshield 11 and the bottom plate 251. The camera front space S is a tapered space when viewed in cross section which is small in the front and large in the rear. The bottom plate 251 has a front end having an opened space between the windshield 11 and the bottom plate 251, providing a gap. The gap between the windshield 11 and the bottom plate 251 may serve as an inlet I that introduces defroster wind D. The defroster wind D1 that has entered the camera front space S flows outward from the gap G1 provided between the light shielding member 25 and the camera 21.

Figure 6:
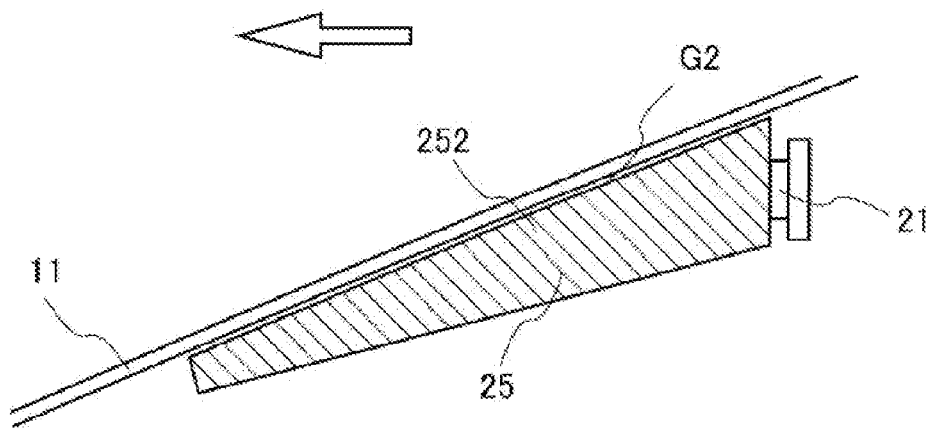
FIG. 6 is a side view of the region in the vicinity of the light shielding member according to the comparative example.

FIG. 6 illustrates a side surface of the light shielding member 25 according to the comparative example. FIG. 6 illustrates the vehicle external region imaging apparatus 2 attached to the vehicle 1, and a cross section of the windshield 11 in the vicinity of the vehicle external region imaging apparatus 2. In FIG. 6, a white arrow indicates the front of the vehicle 1. The side plate 252 of the light shielding member 25 and the windshield 11 have a gap G2 provided therebetween. The gap G2 allows an airflow to travel from the gap G2 to the outside along an inner surface of the windshield 11 from the camera front space S on an inner side of the light shielding member 25. The camera 21 is positioned at the cut-out 253 illustrated in FIG. 4 at the rear of the light shielding member 25. The cut-out 253 and the camera 21 are not in close contact with each other, and have the gap G1 illustrated in FIG. 3 between the cut-out 253 and the camera 21. The airflow also travels from the inner side of the light shielding member 25 downward and rearward from the gap G1.

Referring to FIG. 5, light L1 from the interior of the vehicle 1 is blocked by the bottom plate 251 of the light shielding member 25 and the unillustrated cover member and does not reach the camera front space S, and is prevented from entering the camera 21 as reflected light reflected from the windshield 11. However, light L2 at a small angle can pass through the inlet I, reach the camera front space S, and enter a lens of the camera 21. Accordingly, it is not possible to increase a distance between the windshield 11 and the bottom plate 251 at the inlet I. However, the narrow distance between the windshield 11 and the bottom plate 251 at the inlet I makes the defroster wind D indicated by a black arrow in FIG. 5 difficult to enter the camera front space S, and most of the defroster wind D serves as defroster wind D2 that flows below the bottom plate 251. This in turn reduces the defroster wind D1 in the camera front space S between the bottom plate 251 and the windshield 11, making it difficult to remove condensation and fogging of an inner side of the windshield 11 and the lens of the camera 21.

Figure 7:
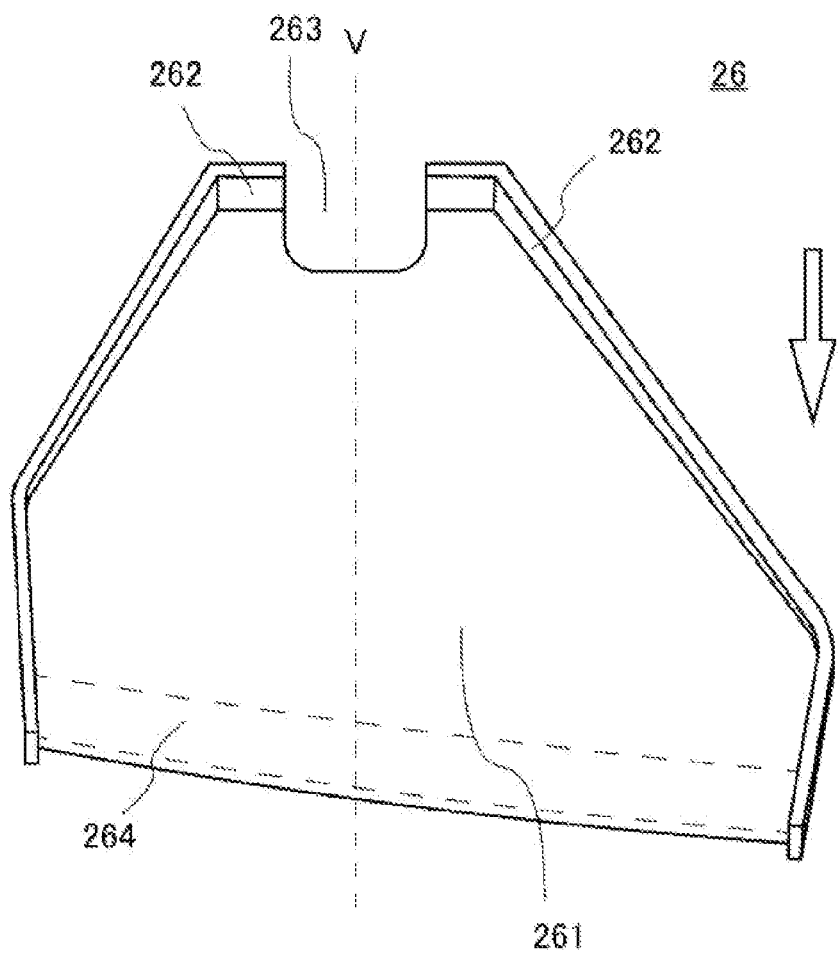
FIG. 7 is an oblique top view of a light shielding member according to one example embodiment of the disclosure.

FIG. 7 is a view of the light shielding member 26 according to the example embodiment of the disclosure as viewed from an obliquely upper side. In FIG. 7, a white arrow indicates the front of the vehicle 1. FIG. 7 is a diagram as viewed from the windshield 11 side, and corresponds to a front view of the light shielding member 26 in FIG. 3. The light shielding member 26 may have a lateral width that is gradually narrowed in a lateral direction from the middle in a front-rear direction to the rear. The light shielding member 26 may include a bottom plate 261, a side plate 262, a cut-out 263, and a front part 264. The side plate 262 may rise from a side of the bottom plate 261. The side plate 262 may be provided in three directions, excluding the front of the bottom plate 261. The bottom plate 261 and the side plate 262 may be cut out at a rear part of the light shielding member 26, providing the cut-out 263. Unlike the light shielding member 25 according to the comparative example, the bottom plate 261 of the light shielding member 26 may have a curved surface in which a surface, of the front part 264, opposed to the windshield 11 bulges upward.

Figure 8:
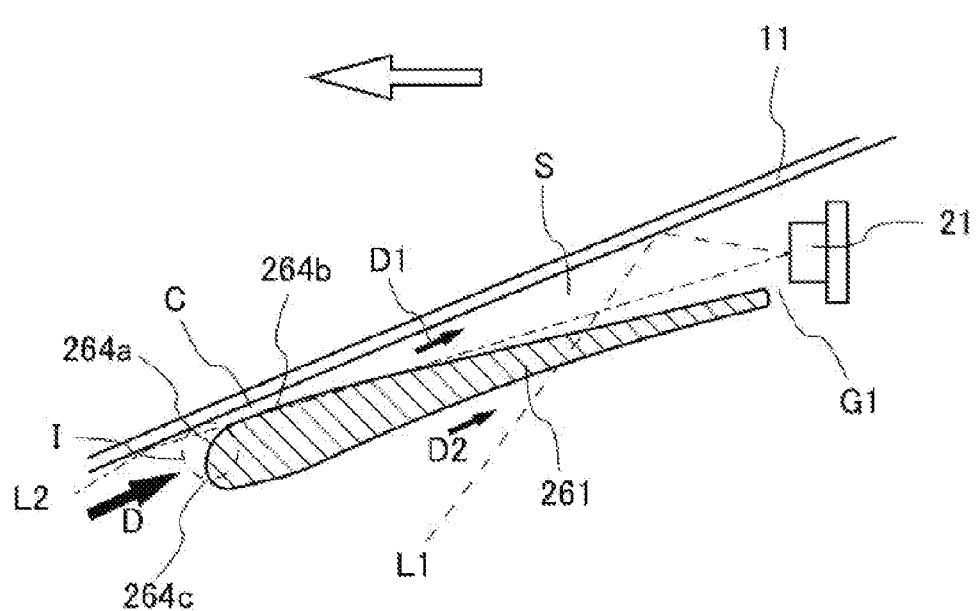
FIG. 8 is a cross-sectional view of a region in the vicinity of the light shielding member according to one example embodiment of the disclosure.

FIG. 8 is a cross-sectional view of the light shielding member 26 according to the example embodiment of the disclosure, vertically cut along a dotted line V in FIG. 7, and of a region in the vicinity of the light shielding member 26. The camera front space S may be provided between the windshield 11 and the bottom plate 261. The camera front space S may have a substantially wedge-shape. The bottom plate 261 may have a curved surface in which an upper surface of the front part 264 positioned at the front is bulged upward. As illustrated in FIG. 8, the front part 264 may be positioned on a side, of the light shielding member 26, that receives blowing of the defroster wind D, and include a front region 264a and a front region 264b. The front region 264a may have a curved surface in front of a part that is closest to the windshield 11. The front region 264b may have a curved surface at the rear of the part closest to the windshield 11. The windshield 11 and the front part 264 may have a space provided therebetween. The space may serve as a blowing path C that takes in the defroster wind D. The defroster wind D1 that has entered the camera front space S may flow outward from the gap G1 provided between the light shielding member 26 and the camera 21. In addition, a front end surface 264c may be a front end of the front region 264a of the bottom plate 261 and may have a longitudinal cross-sectional surface that is so curved as to bulge forward along a surface of the windshield 11. Accordingly, the bottom plate 261 may have a cross-sectional shape similar to that of an airplane wing. The vehicle external region imaging apparatus 2 according to the example embodiment having the light shielding member 26 may be mounted inside the vehicle 1, and may perform the imaging of the region outside the vehicle 1 through the glass of the vehicle 1.

Figure 9:
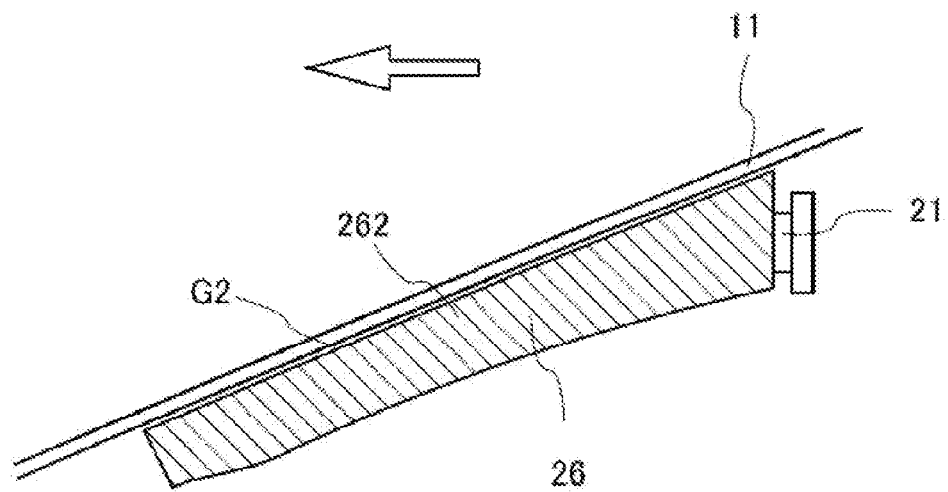
FIG. 9 is a side view of the region in the vicinity of the light shielding member according to one example embodiment of the disclosure.

FIG. 9 illustrates a side surface of the light shielding member 26 according to the example embodiment of the disclosure. FIG. 9 illustrates the vehicle external region imaging apparatus 2 attached to the vehicle 1, and the windshield 11 in the vicinity of the vehicle external region imaging apparatus 2. In FIG. 9, a white arrow indicates the front of the vehicle 1. The side plate 262 of the light shielding member 26 and the windshield 11 may have the gap G2 provided therebetween. The gap G2 may allow the airflow to travel laterally from an inner side of the light shielding member 26. The camera 21 may be positioned at the cut-out 263 illustrated in FIG. 7 at the rear of the light shielding member 26. The cut-out 263 and the camera 21 may not be in close contact with each other, and have the gap G1 illustrated in FIG. 3 between the cut-out 263 and the camera 21. The airflow may also travel from the inner side of the light shielding member 26 downward and rearward from the gap G1.

Referring to FIG. 8, the light L1 from the interior of the vehicle 1 may be blocked by the bottom plate 261 of the light shielding member 26 and the unillustrated cover member and may not reach the camera front space S, and may be prevented from entering the camera 21 as the reflected light reflected from the windshield 11. In addition, the light L2 at the small angle may reach the blowing path C after being reflected by the windshield 11, but may be blocked by the curved surface of the front region 264b and may not reach the camera front space S, and may be thereby prevented from entering the lens of the camera 21. Accordingly, it is possible for the light shielding member 26 to have a high light shielding property owing to a shape of the bottom plate 261 without narrowing the blowing path C too much. In addition, a shape between the windshield 11 and the front region 264a helps to increase a pressure at an entrance of the blowing path C, which in turn helps to introduce more defroster wind D indicated by a black arrow into the camera front space S through the blowing path C. Further, the front end surface 264c of the bottom plate 261 may be so curved as to bulge forward along a surface of the windshield 11. The defroster wind D that has collided with the front end surface 264c may generate a high-pressure part, and an airflow may travel along the front part 264 of the bottom plate 261 above the high-pressure part, which helps to allow more defroster wind D1 to be introduced into the camera front space S. Below the high-pressure part, the defroster wind D2 may flow along a lower surface of the bottom plate 261.

The front part 264 may be provided on a light incident side of the camera 21. The front part 264 may block the reflected light that is reflected by the inner surface of the windshield 11 and enters the camera 21, and may have the blowing path C provided between the front part 264 and the inner surface of the windshield 11. The front region 264a may have, at the inlet I, the spherical surface bulging toward the inner surface of the windshield 11 and the curved surface bulging toward a blowing direction of the defroster wind D, e.g., toward the blowing path C.

First Modification Example

Figure 10:
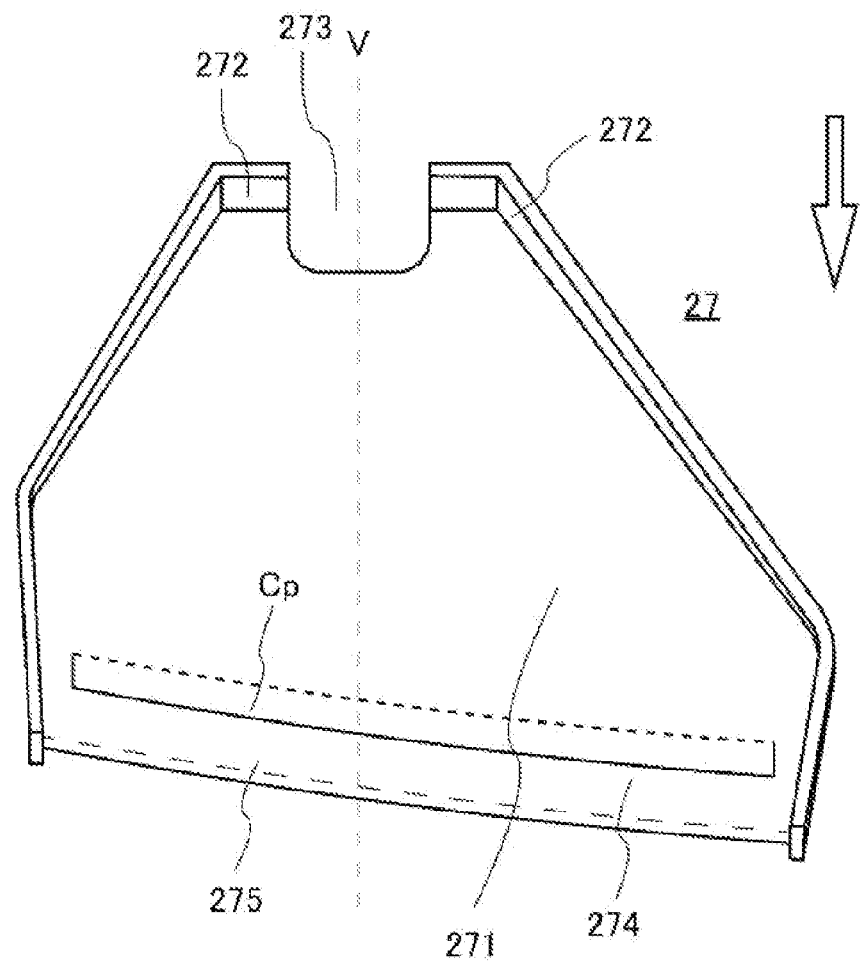
FIG. 10 is an oblique top view of a light shielding member according to a first modification example of one example embodiment of the disclosure.

In a first modification example, the bottom plate 261 according to the example embodiment described above may have a slat flow path Cp. The slat flow path Cp may be a blowing path different from the blowing path C. FIG. 10 is a view of a light shielding member 27 according to the first modification example as viewed from an obliquely upper side. In FIG. 10, a white arrow indicates the front of the vehicle 1. FIG. 10 is a diagram as viewed from the windshield 11 side. The light shielding member 27 may be gradually narrowed in a lateral direction from the middle in a front-rear direction to the rear. A side plate 272 may rise from a side of a bottom plate 271. The side plate 272 may be provided in three directions, excluding the front of the bottom plate 271. The bottom plate 271 and the side plate 272 may be cut out at a rear part of the light shielding member 27, providing a cut-out 273. As with the light shielding member 26, the bottom plate 271 of the light shielding member 27 may have a curved surface in which an upper surface of a front part 274 bulges upward. In addition, the front part 274 may have a gap of the slat flow path Cp, and the front of the slat flow path Cp may serve as a slat 275.

Figure 11:
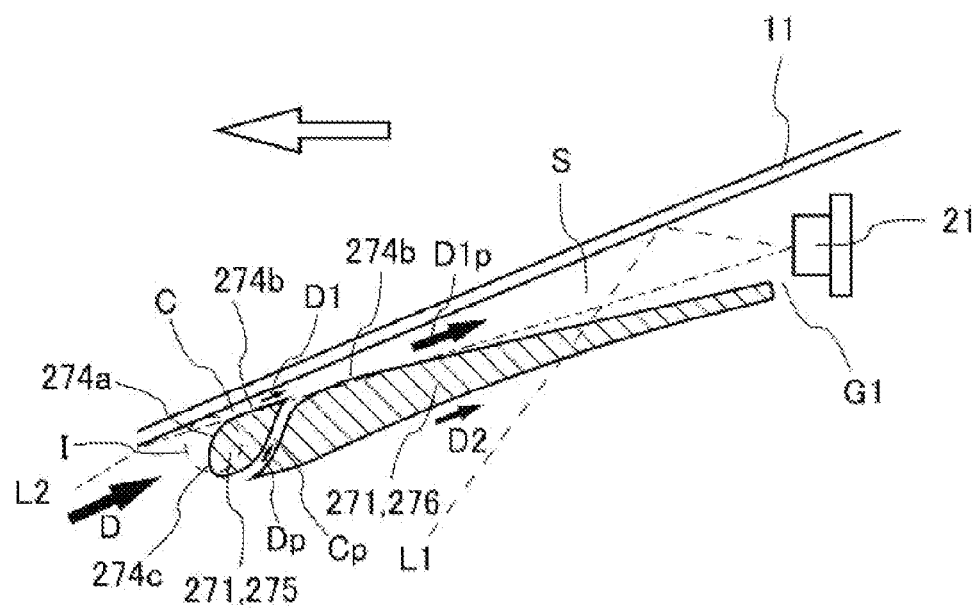
FIG. 11 is a cross-sectional view of a region in the vicinity of the light shielding member according to the first modification example.

FIG. 11 is a cross-sectional view of a region in the vicinity of the light shielding member 27 according to the first modification example, including a cross-section of the light shielding member 27, vertically cut along a dotted line V in FIG. 10. The camera front space S may be provided between the windshield 11 and the bottom plate 271. The camera front space S may have the substantially wedge-shape. The bottom plate 271 may have a curved surface in which the upper surface of the front part 274 positioned at the front is bulged upward. The windshield 11 and the front part 274 may have a space provided therebetween. The space may serve as the blowing path C that takes in the defroster wind D. The defroster wind D1 that has entered the camera front space S may flow outward from the gap G1 provided between the light shielding member 27 and the camera 21 and from the gap G2 provided between the windshield 11 and the side plate 272. The front part 274 may include a front region 274a and a front region 274b. The front region 274a may have a curved surface in front of a part that is closest to the windshield 11. The front region 274b may have a curved surface at the rear of the part closest to the windshield 11. In addition, a front end surface 274c may be a front end of the front region 274a of the bottom plate 271 and may have a longitudinal cross-sectional surface that is so curved as to bulge forward along a surface of the windshield 11. Accordingly, the bottom plate 271 may have a cross-sectional shape similar to that of an airplane wing. Further, the bottom plate 271 may have the slat flow path Cp that is obliquely directed forward. The front of the slat flow path Cp may be the slat 275.

As illustrated in FIG. 11, the light L1 from the interior of the vehicle 1 may be blocked by the bottom plate 271 of the light shielding member 27 and may not reach the camera front space S, and may be prevented from entering the camera 21 as the reflected light reflected from the windshield 11 as with the example embodiment illustrated in FIG. 8. In addition, the light L2 at the small angle may reach the blowing path C after being reflected by the windshield 11, but may be blocked by the curved surface of the front region 274b and may not reach the camera front space S, and may be thereby prevented from entering the camera 21. Accordingly, it is possible for the light shielding member 27 to have a high light shielding property owing to a shape of the bottom plate 271 without narrowing the blowing path C too much. In addition, a shape between the windshield 11 and the front region 274a helps to increase a pressure at an entrance of the blowing path C, which in turn helps to introduce the defroster wind D indicated by a black arrow into the camera front space S through the blowing path C. Further, the front end surface 274c of the bottom plate 271 may be so curved as to bulge forward along a surface of the windshield 11. The defroster wind D that has collided with the front end surface 274c may generate a high-pressure part, and an airflow may travel along the front part 274, which helps to allow even more defroster wind D1 to be introduced into the camera front space S.

Further, in the first modification example, the front side of the bottom plate 271 may be the slat 275, and the rear side of the bottom plate 271 may be a bottom plate body 276. The slat flow path Cp as the gap from a front lower part to a rear upper part of the slat 275 may be provided between a lower surface of the slat 275 and an upper surface of the bottom plate body 276. The lower surface of the slat 275 forming the slat flow path Cp may curve in the same direction from the bulged curved surface of the front end surface 274c, and further curve in an opposite direction to reach a rear end of the slat 275. The upper surface of the bottom plate body 276 may be so curved as to follow substantially along a surface of the windshield 11 in the vicinity of a front end, and may be so curved as to oppose the windshield 11 as going rearward. Thereafter, the upper surface of the bottom plate body 276 may curve in an opposite direction in the middle, forming an S-shape. The slat flow path Cp as the gap interposed between the slat 275 and the bottom plate body 276 may curve in a substantially S-shape when viewed in a lateral cross section, preventing the light from the interior of the vehicle 1 from reaching the camera front space S through the slat flow path Cp. The defroster wind D that has collided with the front end surface 274c may generate the high-pressure part and may be divided into the upper defroster wind D and the lower defroster wind D. The upper defroster wind D1 may reach the camera front space S via the blowing path C, and defroster wind Dp as a part of the lower defroster wind D may reach the camera front space S via the slat flow path Cp. In the camera front space S, the defroster wind D1 and the defroster wind Dp may combine to form defroster wind D1p. As described above, the slat 275 helps to deliver a larger amount of defroster wind D1p to the camera front space S than in the foregoing example embodiment while maintaining the light shielding property by the bottom plate 271.

The front part 274 may be provided on the light incident side of the camera 21. The front part 274 may block the reflected light that is reflected by the inner surface of the windshield 11 and enters the camera 21, and may have the blowing path C provided between the front part 274 and the inner surface of the windshield 11. The slat 275 having the front part 274 may have the slat flow path Cp provided between the slat 275 and the bottom plate body 276. The front region 264a may have, at the inlet I, the curved surface bulging toward the inner surface of the windshield 11 and the curved surface bulging toward the blowing direction of the defroster wind D, e.g., toward the blowing path C.

Second Modification Example

Figure 12:
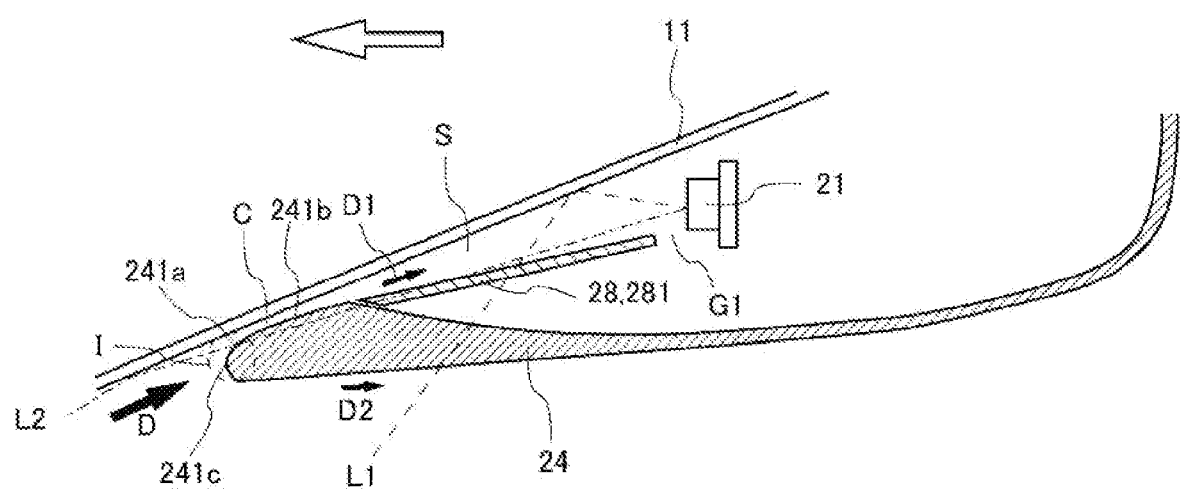
FIG. 12 is a cross-sectional view of a region in the vicinity of a light shielding member according to a second modification example of one example embodiment of the disclosure.

In a second modification example, a front side of a bottom plate 281 according to the example embodiment may serve as a cover member 24. FIG. 12 is a cross-sectional view of a region in the vicinity of the light shielding member 28 according to the second modification example. The camera front space S may be provided between the windshield 11 and the bottom plate 281. The camera front space S may have the substantially wedge-shape. The cover member 24 may have a curved surface in which the upper surface of the front part 241 positioned at the front is bulged upward. The windshield 11 and the front part 241 may have the space provided therebetween. The space may serve as the blowing path C that takes in the defroster wind D. The defroster wind D1 that has entered the camera front space S may flow outward from the gap G1 provided between the light shielding member 28 and the camera 21 and from the gap G2 provided between the windshield 11 and an unillustrated side plate. The front part 241 may include a front region 241a and a front region 241b. The front region 241a may have a curved surface in front of a part that is closest to the windshield 11. The front region 241b may have a curved surface at the rear of the part closest to the windshield 11. In addition, the front end surface 274c may be a front end of the front region 241a of the cover member 24 and may have a longitudinal cross-sectional surface that is so curved as to bulge forward along a surface of the windshield 11.

As illustrated in FIG. 12, the light L1 from the interior of the vehicle 1 may be blocked by the cover member 24 and the bottom plate 281 and may not reach the camera front space S, and may be prevented from entering the camera 21 as the reflected light reflected from the windshield 11. In addition, the light L2 at the small angle may reach the blowing path C after being reflected by the windshield 11, but may be blocked by the curved surface of the front region 241b of the cover member 24 and may not reach the camera front space S, and may be thereby prevented from entering the camera 21. Accordingly, the cover member 24 helps to achieve a high light shielding property without narrowing the blowing path C too much. In addition, a shape between the windshield 11 and the front of the front part 241 helps to increase a pressure at an entrance of the blowing path C, which in turn helps to introduce the defroster wind D indicated by a black arrow into the camera front space S through the blowing path C. Further, the front end surface 274c may be so curved as to bulge forward along a surface of the windshield 11. The defroster wind D that has collided with the front end surface 274c may generate a high-pressure part, and an airflow may travel along the front part 241 of the cover member 24 above the high-pressure part, which helps to allow even more defroster wind D1 to be introduced into the camera front space S. Below the high-pressure part, the defroster wind D2 may flow along a lower surface of the cover member 24.

The front part 241 may be provided on the light incident side of the camera 21. The front part 241 may block the reflected light that is reflected by the inner surface of the windshield 11 and enters the camera 21, and may have the blowing path C provided between the front part 241 and the inner surface of the windshield 11. The front region 241a may have, at the inlet I, the spherical surface bulging toward the inner surface of the windshield 11 and the curved surface bulging toward the blowing direction of the defroster wind D, e.g., toward the blowing path C.

In the example embodiment, the light shielding member 26 may be provided as a single member. In some embodiments, the light shielding member 26 may be multiple members including, for example, a combination of the front part 264 as a separate member. This applies similarly to the modification examples. Further, the example embodiment and the modification examples have been described in which the vehicle external region imaging apparatus is used for the driving assist system and captures an image of a region outside the vehicle. In some embodiments, the vehicle external region imaging apparatus may be used for any other apparatus such as a drive recorder. In some embodiments, the vehicle external region imaging apparatus may be mounted on an inner side of any glass other than the windshield, instead of mounting the vehicle external region imaging apparatus on the inner side of the windshield. In some embodiments, the front part having the curved surface may be positioned on a side, of the attachment member, that receives the defroster wind. The attachment member may be, for example, a bracket, and support the light receiver such as a camera and attached to a glass or to a member that fixes the glass.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Further, techniques according to the example embodiments and their modification examples described above may be combined in any combination unless any particular contradiction or issue occurs in terms of a purpose, a configuration, etc., thereof.

According to at least one embodiment of the disclosure, it is possible to sufficiently take in defroster wind with a gap of a vent being narrowed to prevent reflected light reflected from a glass from being reflected in a light receiver, and to effectively prevent generation of condensation and fogging or effectively remove the generated condensation and fogging.

The invention claimed is:

1. A vehicle external region imaging apparatus to be mounted inside a vehicle, the vehicle external region imaging apparatus being configured to perform imaging of a region outside the vehicle through a glass of the vehicle, the vehicle external region imaging apparatus comprising:
   a light receiver configured to receive light to be transmitted through the glass; and
   a front part provided on a light incident side of the light receiver and configured to block reflected light that is to be reflected by an inner surface of the glass and enters the light receiver, the front part having a first blowing path provided between the front part and the inner surface of the glass and configured to allow a wind to flow therethrough, wherein
   the front part comprises, at an inlet of the first blowing path, a curved surface bulging toward the inner surface of the glass and a curved surface bulging toward the first blowing path.

2. The vehicle external region imaging apparatus according to claim 1, wherein the front part is positioned on a side, of a light shielding member, that is to receive the wind, the light shielding member being provided on the light incident side of the light receiver and being opposed to the inner surface of the glass.

3. The vehicle external region imaging apparatus according to claim 1, wherein the front part is positioned on a side, of an attachment member, that is to receive the wind, the attachment member being configured to support the light receiver and configured to be attached to the glass or to a member that fixes the glass.

4. The vehicle external region imaging apparatus according to claim 1, wherein the front part is positioned on a side, of a cover member, that is to receive the wind, the cover member being configured to cover the light receiver.

5. The vehicle external region imaging apparatus according to claim 1, wherein the front part further has a second blowing path different from the first blowing path.

* * * * *